(12) United States Patent
Ichikawa et al.

(10) Patent No.: US 6,582,325 B1
(45) Date of Patent: *Jun. 24, 2003

(54) SOLID GOLF BALLS AND METHOD OF MAKING

(75) Inventors: Yasushi Ichikawa, Chichibu (JP); Shunichi Kashiwagi, Chichibu (JP); Rinya Takesue, Chichibu (JP); Nobuhiko Matsumura, Izumiohtsu (JP); Kunitoshi Ishihara, Izumiohtsu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/641,968

(22) Filed: Aug. 21, 2000

Related U.S. Application Data

(63) Continuation-in-part of application No. 09/211,055, filed on Dec. 15, 1998, now Pat. No. 6,123,628.

(30) Foreign Application Priority Data

Dec. 17, 1997 (JP) .............................................. 9-364154

(51) Int. Cl.$^7$ ......................... A63B 37/17; A63B 37/14; A63B 37/00
(52) U.S. Cl. ........................................ 473/378; 473/351
(58) Field of Search ................................ 473/364, 367, 473/368, 370, 371, 373, 374, 376, 377, 378

(56) References Cited

U.S. PATENT DOCUMENTS

| | | | |
|---|---|---|---|
| 4,066,397 A | * 1/1978 | Carroll | .......................... 8/192 |
| 4,748,194 A | 5/1988 | Geeck | |
| 5,019,319 A | 5/1991 | Nakamura et al. | |
| 5,112,556 A | * 5/1992 | Miller | ....................... 264/279 |
| 5,334,673 A | 8/1994 | Wu | |
| 5,356,149 A | 10/1994 | Kane | |
| 5,484,870 A | * 1/1996 | Wu | ............................... 528/28 |
| 5,589,543 A | * 12/1996 | Yokelson et al. | ........... 525/131 |
| 5,589,546 A | 12/1996 | Hiraoka et al. | |
| 5,674,137 A | 10/1997 | Maruko et al. | |
| 5,721,304 A | 2/1998 | Pasque, Jr. | |
| 5,744,549 A | 4/1998 | Lutz | |
| 5,779,562 A | 7/1998 | Melvin et al. | |
| 5,792,803 A | 8/1998 | Savin | |
| 5,800,286 A | 9/1998 | Kakiuchi et al. | |
| 5,803,831 A | 9/1998 | Sullivan et al. | |
| 5,833,553 A | 11/1998 | Sullivan et al. | |
| 5,879,244 A | * 3/1999 | Hwang | ........................ 473/373 |
| 5,929,170 A | * 7/1999 | Kawabata et al. | ........... 525/221 |
| 5,929,189 A | * 7/1999 | Ichikawa et al. | .............. 528/76 |
| 6,123,628 A | * 9/2000 | Ichikawa et al. | ............. 156/146 |

FOREIGN PATENT DOCUMENTS

JP        09271538 A    * 10/1997           A63B/37/00

OTHER PUBLICATIONS

Ulrich, Henri, "Urethane Polymers", Kirk–Othmer Encyclopedia of Chemical Technology, Copyright 1997 by John Wiley & Sons, Inc.*
KirK–Othmer, Concise Encyclopedia of Chemical Technology. New York: John Wiley and Sons, Inc., p. 1211–1212.*
Callister, Jr., William D., Materials Science and Engineering: An Introduction, 4$^{th}$ Edition. New York:John Wiley and Sons, Inc. 1997, p 493.*

* cited by examiner

Primary Examiner—Paul T. Sewell
Assistant Examiner—Alvin A. Hunter, Jr.
(74) Attorney, Agent, or Firm—Sughrue Mion, PLLC

(57) ABSTRACT

A solid golf ball has a solid core and a cover formed of a resin composition comprising the reaction product of a thermoplastic polyurethane elastomer with dicyclohexylmethane-4, 4"-diisocyanate. The ball is efficiently moldable and meets such requirements as a pleasant feel, ease of control, high resilience, and minimized scuffs by iron shots.

4 Claims, No Drawings

SOLID GOLF BALLS AND METHOD OF MAKING

CROSS REFERENCE TO RELATED APPLICATION

This application is a continuation-in-part of application Ser. No. 09/211,055 filed on Dec. 15, 1998, U.S. Pat. No. 6,123,628, the entire contents of which are hereby incorporated by reference.

This invention relates to solid golf balls comprising a core and a cover which are efficiently moldable and meet such requirements as a pleasant feel, ease of control, high resilience, and minimized scuffs by iron shots.

BACKGROUND OF THE INVENTION

Professional and skilled golfers favor golf balls using balata rubber as the cover stock because the balata cover offers a soft feel, a desired spin rate and control upon iron shots.

The golf balls using balata rubber, however, are rather difficult to mold and require an increased material cost and manufacturing cost. Because of low resilience, balata rubber is believed unsuitable for combination with solid cores. Another problem of the balata cover balls is that upon iron shots, the cover surface is scraped off by grooves across the iron clubface owing to the frictional force between the clubface and the cover, so that the ball surface is marred or fluffed.

Ionomer resin covers have been proposed. Sullivan, U.S. Pat. No. 4,884,814 or JP-A 308577/1989 discloses to blend an ionomer resin in the form of an ethylene/(meth)acrylic acid copolymer having a certain spectrum of physical properties with a relatively soft ionomer resin in the form of an ethylene/(meth)acrylic acid/(meth)acrylate terpolymer. The soft/hard ionomer blend is used as a golf ball cover. JP-A 277208/1993 discloses a golf ball using a mixture of two or more metal salts of ethylene-unsaturated carboxylic acid-unsaturated carboxylate terpolymers having a low flexural modulus as the cover stock. These are very effective techniques for achieving significant improvements in productivity and cost while maintaining hitting feel and controllability comparable to the balata rubber.

The ionomer resin covers of these patents, however, still suffer from the problem that the ball surface is marred or fluffed by iron shots because the cover surface is scraped off by grooves across the iron clubface. Additionally, on account of low resilience, the ionomer resin covers invite a substantial drop of resilience when combined with solid cores.

Many attempts were made to use thermosetting polyurethane elastomers as a substitute for the balata rubber and ionomer resins because the polyurethane elastomers are relatively inexpensive and offer good feeling and good scuff resistance. See U.S. Pat. Nos. 3,989,568, 4,123,061, and 5,334,673. Despite improvements in the scuff resistance which is the drawback of softened ionomer resin blends, the thermosetting polyurethane elastomers require complex steps of introducing the raw material and then effecting curing reaction, indicating that further efforts must be made for mass-scale production.

Also, U.S. Pat. Nos. 3,395,109, 4,248,432 and 4,442,282 disclose thermoplastic polyurethane elastomers as the cover stock. They do not satisfy all the requirements of moldability, hitting feel, control, resilience, and scuff resistance upon iron shots.

In this regard, we proposed in JP-A 271538/1997 the use of high resilience thermoplastic polyurethane elastomers. A further improvement in scuff resistance upon iron shots is desired.

SUMMARY OF THE INVENTION

An object of the invention is to provide a solid golf ball which is efficiently moldable and meet such requirements as a pleasant feel, ease of control, initial velocity (resilience and flight distance), scuff resistance upon iron shots, and non-discoloration.

The invention pertains to a solid golf ball comprising a solid core and a cover enclosing the core. According to the invention, the reaction product of a thermoplastic polyurethane elastomer with dicyclohexylmethane-4,4"-diisocyanate as an isocyanate compound is used as a main component of a resin composition of which the cover is formed. This resin composition or cover stock is efficient to mold. The resulting solid golf ball meet such requirements as a pleasant feel, ease of control, resilience (initial velocity and flight distance), scuff resistance upon iron shots, and non-discoloration.

More specifically, when a core is enclosed with a cover obtained by subjecting a thermoplastic polyurethane elastomer to crosslinking reaction with dicyclohexylmethane-4,4"-diisocyanate, the ball is significantly improved in scuff resistance upon iron shots. The ball offers a pleasant feel, ease of control, and excellent resilience (initial velocity and flight distance). Moreover, the ball is prevented from discoloring. The crosslinking reaction is effected by adding such an amount of dicyclohexylmethane-4,4"-diisocyanate to a thermoplastic polyurethane elastomer that the thermoplastic polyurethane elastomer remains at a thermoplastic level sufficient to allow injection molding, heating and melting them for reaction to give a batchwise mix, and injection molding the mix. Alternatively, a dry blend of a thermoplastic polyurethane elastomer and dicyclohexylmethane-4,4"-diisocyanate is kneaded and reacted while it is injection molded.

Known in the prior art is a method for preparing a resin molding by causing a polyisocyanate compound to penetrate into a surface layer of polyurethane base resin molding (JP-A 47630/1994). A focus was also placed on polyurethane elastomers having properties comparable to those of thermosetting polyurethane elastomers. In JP-B 2063/1983, a molding is prepared by feeding a batchwise mixture of an isocyanate compound and a compound which is not reactive with isocyanate radicals into a molding machine along with a thermoplastic polyurethane elastomer.

When these prior art methods are applied to the cover of golf balls, the former method requires a prolonged time and a sophisticated technique and is thus impractical. The batchwise mixture of isocyanate compound used in the latter method, at its surface, is unstable in air at room temperature because the isocyanate compound has not been inactivated by chemical reaction. The batchwise mixture must be stored prior to use under conditions capable of avoiding reaction with moisture in air. Additionally, reaction of the batchwise mixture with a thermoplastic polyurethane elastomer is rapid and difficult to control. It is then difficult to produce molded parts of consistent quality on a mass scale. The use in the batchwise mixture of the compound which is not reactive with isocyanate radicals detracts from the physical properties required as the golf ball cover such as resilience and scuff resistance upon iron shots.

DETAILED DESCRIPTION OF THE INVENTION

In the solid golf ball of the invention, the cover is formed of a resin composition primarily comprising the reaction product between (1) a thermoplastic polyurethane elastomer and (2) dicyclohexylmethane-4,4"-diisocyanate.

The thermoplastic polyurethane elastomer (1) has a structure including soft segments of a high molecular weight polyol (or polymeric glycol) and hard segments constructed of a chain extender and a diisocyanate.

The high molecular weight polyol used as one source material may be any of those commonly used in the prior polyurethane elastomer art. Polyester and polyether polyols are generally included. Polyester polyols include polybutylene adipate, polyethylene butylene adipate, polyethylene adipate, polycaprolactone and blends thereof. One exemplary polyether polyol is polyoxytetramethylene glycol. These polyols preferably have an average molecular weight of about 1,000 to about 5,000.

The chain extender used herein may be any of those commonly used in the prior polyurethane elastomer art. Examples include 1,4-butylene glycol, 1,2-ethylene glycol, 1,3-butane diol, 1,6-hexane diol, 2,2-dimethyl-1,3-propane diol, 4,4'-diaminodiphenylmethane, hydrogenated MDA, isophorone diamine, hexamethylenediamine, and hydroquinone diethylol ether. The chain extenders preferably have an average molecular weight of about 200 to about 15,000.

The diisocyanate used herein may be any of those commonly used in the prior polyurethane elastomer art. Examples include aromatic diisocyanates such as 2,4-toluene diisocyanates, 2,6-toluene diisocyanate, mixtures thereof, 4,4'-diphenylmethane diisocyanate, m-phenylene diisocyanate, and 4,4'-biphenyl diisocyanate; aliphatic diisocyanates such as tetramethylene diisocyanate, hexamethylene diisocyanate (HDI), and octamethylene diisocyanate; and alicyclic diisocyanates such as xylene diisocyanate. Use of hexamethylene diisocyanate is preferable from the non-yellowing standpoint.

The thermoplastic polyurethane elastomer constructed from the foregoing components is commercially available, for example, under the trade name of Pandex T-1195, T-R3080, T-7295, and T-7298 from Dainippon Ink & Chemicals K. K.

In addition to the above-mentioned thermoplastic polyurethane elastomer, another polymer such as a thermoplastic elastomer may be further blended. There may be blended, for example, polyamide elastomers, polyester elastomers, ionomer resins, styrene block elastomers, hydrogenated polybutadiene, and ethylene-vinyl acetate (EVA) copolymers. Any of hard resins such as polycarbonates and polyacrylates may also be added and mixed. The amount of the other polymer blended is 0 to 100 parts, preferably 10 to 75 parts, more preferably 10 to 50 parts by weight, per 100 parts by weight of the thermoplastic polyurethane elastomer as the essential component. The amount of the other polymer blended may be adjusted as appropriate in accordance with the desired hardness adjustment, resilience improvement, flow improvement and adhesion to the solid core surface.

Component (2) is dicyclohexylmethane-4,4"-diisocyanate.

Dicyclohexylmethane-4,4"-diisocyanate is preferably blended with the thermoplastic polyurethane elastomer (1) in such amounts that 0.05 to 10 parts, more preferably 0.2 to 5 parts, most preferably 0.2 to 5 parts of dicyclohexylmethane-4,4"-diisocyanate is present per 100 parts by weight of the thermoplastic polyurethane elastomer. On this basis, less than 0.05 part of the diisocyanate would induce insufficient crosslinking reaction and little improvements in physical properties. More than 10 parts of the diisocyanate would give the reaction product which experiences substantial yellowing with time, heat and ultraviolet radiation, and loses thermoplastic properties and resilience.

In the practice of the invention, the dissociation reaction rate and temperature of the diisocyanate can be controlled by a catalyst. The catalyst used herein may be any of catalysts commonly used in urethane reaction, for example, tin compounds such as 1,3-diacetoxytetrabutyl-stannoxane, metal (excluding tin) salts of organic acids such as 2-ethylhexyl titanate, common inorganic metal salts such as stannic chloride, and tertiary amines such as N-methylmorpholine. The amount of the catalyst blended is preferably about 0.01 to 3 parts, more preferably about 0.05 to 1 parts by weight per 100 parts by weight of the thermoplastic polyurethane elastomer.

In the golf ball cover stock according to the invention, various other additives may be blended in addition to the above-described essential components. For example, pigments, dispersants, antioxidants, UV absorbers, and parting agents may be added in conventional amounts.

According to the invention, a solid core is enclosed in the above-described cover stock to form a golf ball. The solid core used herein is preferably formed of a rubber composition based on cis-1,4-polybutadiene to a specific gravity of 0.95 to 1.13, especially 0.97 to 1.10. With a core having a specific gravity in excess of 1.13, golf balls having a diameter of 42.67 to 42.9 mm would sometimes exceed the weight limit prescribed in the Rules of Golf. Additionally, such a core would be reduced in resilience owing to the specific gravity adjusting additive causing an energy loss upon impact, and as a result, the golf ball would not travel a satisfactory distance. With a core having a specific gravity of less than 0.95, golf balls having the above-described diameter would be far lighter than the weight limit prescribed in the Rules of Golf and be readily affected by the wind.

In the practice of the invention, the solid core may be either a single-layer core used in two-piece golf balls or a multiple solid core of multilayer structure including an outer layer surrounding an inner layer. Solid cores prepared from well-known compositions by well-known methods may be used.

The golf ball of the invention can be manufactured by well-known methods. Since the cover stock is thermoplastic, there may be used an injection molding method involving placing a preformed core in a mold and directly injecting the cover stock into the mold and a compression molding method involving performing a pair of hemispherical half cups from the cover stock, and encasing a core in the pair of half cups, followed by heat compression molding at 140 to 180° C. for 2 to 10 minutes. The injection molding method is advantageous.

The injection molding is carried out in either of the following methods (1) and (2).

(1) Dicyclohexylmethane-4,4"-diisocyanate is added to a thermoplastic polyurethane elastomer in such amounts that the thermoplastic polyurethane elastomer remains at a thermoplastic level. The mixture is heated and melted for reaction, obtaining a batchwise cover stock, which is then injection molded.

(2) A thermoplastic polyurethane elastomer and dicyclohexylmethane-4,4"-diisocyanate are dry blended. The dry blend is kneaded and reacted at the same time as it is injection molded.

Specifically in method (1), with respect to the amount of the diisocyanate ensuring that the thermoplastic polyurethane elastomer remains at a thermoplastic level, the thermoplastic level corresponds to a flow of at least 0.1 g/10 min. as measured at 210° C./2160 g according to ASTM D1238. It is recommended that the heating temperature be 160 to 200° C., especially 170 to 190° C. and the reaction time be 1/2 to 10 minutes, especially 1 to 5 minutes.

In method (2), the dry blending may employ any of well-known techniques, for example, rotating, stationary and high-speed shear flow mixers.

In the invention, the thermoplastic polyurethane elastomer undergoes crosslinking reaction with isocyanate radicals of dicyclohexylmethane-4,4"-diisocyanate during formation of a batchwise cover stock in method (1) or during injection molding in method (2). In this form of reaction or crosslinking, isocyanate radicals react with residual OH radicals on the thermoplastic polyurethane elastomer to form urethane bonds, or addition reaction takes place between urethane radicals and isocyanate radicals to form an allophanate or biuret form.

The golf ball cover thus formed preferably has a Shore D hardness of 35 to 65, more preferably 35 to 60, further preferably 38 to 58, and most preferably 40 to 56. A cover with a Shore D hardness of less than 35 would receive too much spin on short iron shots and be thus difficult to control. A cover with a Shore D hardness of more than 65 would receive least spin on iron shots and give an unpleasant feel when hit. The cover preferably has a thickness or gage in the range of 1 to 5 mm. The cover is not limited to a single layer and may be formed to a multi-layer structure. In the case of the multi-layer construction, the thickness of the entire cover should fall in the above-defined range.

The golf ball of the invention is formed to a diameter and weight as prescribed in the Rules of Golf, specifically a diameter of not less than 42.67 mm and a weight of not greater than 45.93 g. The golf ball constructed according to the invention preferably has a diameter of 42.67 to 42.9 mm. It is recommended that the ball undergo a deflection of 2.0 to 4.0 mm, preferably 2.2 to 4.0 mm, more preferably 2.6 to 3.5 mm, under an applied load of 100 kg.

There has been described a solid golf ball in which the cover is primarily formed of the reaction product between a thermoplastic polyurethane elastomer and dicyclohexylmethane-4,4"-diisocyanate. The cover is efficiently moldable while the solid golf ball meets such requirements as a pleasant feel, ease of control, high resilience, scuff resistance upon iron shots, and non-discoloration. Using the methods of the invention, golf balls can be manufactured on a commercial mass scale.

EXAMPLE

Examples of the invention are given below by way of illustration and not by way of limitation. Parts are by weight.

Examples 1,2 & Comparative Examples 1,2

Solid core A having a diameter of 38.5 mm for two-piece solid golf balls was prepared by kneading a core stock A of the following composition and molding and vulcanizing the stock at 155° C. for 20 minutes.

| Core composition A | Parts by weight |
| --- | --- |
| Polybutadiene rubber | 100 |
| Zinc acrylate | 21.5 |
| Zinc oxide | 12 |
| Dicumyl peroxide | 1 |

The polybutadiene rubber used was commercially available BR01 by Nippon Synthetic Rubber K. K.

The core A was measured for specific gravity, hardness and initial velocity. The hardness of a core was expressed by a deflection (mm) of the core measured under an applied load of 100 kg, with greater values indicating softer cores. The initial velocity of a core was measured according to the method prescribed by USGA or R&A. The results shown in Table 1.

TABLE 1

|  | Core A |
| --- | --- |
| Specific gravity | 1.07 |
| Hardness (mm) | 3.41 |
| Initial velocity (m/s) | 78.12 |

Components of the formulation shown in Table 2 were kneaded in a twin-screw extruder at a temperature of 190° C., obtaining cover compositions.

After solid core A was placed in an injection mold, each of the cover compositions was injected into the mold, forming a solid golf ball having a cover of 2.1 mm thick.

The golf balls thus obtained were examined for various properties by the following tests. The results are shown in Table 2. The hardness and initial velocity of the balls were measured as were the cores.

Flight Test

Using a swing robot equipped with No. 1 wood or driver, the ball was hit at a head speed of 45 m/s (HS45). A carry and a total distance were measured.

Hitting Feel

A panel of five professional golfers and five top amateur golfers carried out an actual hitting test using No. 1 wood or driver. The balls were rated "Exc." when the feel was very good and "Good" when the feel was good.

Control

A panel of five professional golfers and five top amateur golfers carried out an actual hitting test using an iron. The balls were rated "Exc." when the control was very easy and "Good" when the control was relatively easy.

Scuff Resistance Upon Iron Shots

The ball was conditioned at 23° C. Using a swing robot machine having a pitching wedge mounted, the ball was hit three times (at three positions) at a head speed of 37 m/s. The surface state of the ball at the hit positions was rated on a 5-point scale.

5: ball surface intact, or very slight clubface dents

4: some clubface dents, but no fluff on the cover surface

3: fluffy cover surface, noticeable scrapes

2: fluffy cover surface, cracks

1: dimples scraped off

Yellowing (ΔYI)

Using as a mercury lamp a G/B accelerated discoloration tester FM-1 manufactured by Suga Tester K. K. and a fadeometer mercury lamp H400-F manufactured by Toshiba K. K., a ball was illuminated for 24 hours.

The ball was measured for ΔYI before and after each test according to JIS K7103, using a multi-light source spectrometer MSC-IS-2DH manufactured by Suga Tester K. K. Higher values indicate more yellowing.

Excellent: 0.0–3.0

Fairly Good: 3.1–4.5

No Good: 4.6

TABLE 2

|  |  | Example | | Comparative Example | | |
| --- | --- | --- | --- | --- | --- | --- |
| Cover | Cover No. | 1 | 2 | 3 | 4 | 5 |
| Composition (Parts by weight) | Pandex T7298 | 75 | 50 | 75 | 50 | 50 |
|  | Pandex TR3080 | 25 | 50 | 25 | 50 | 50 |
|  | Desmodur W | 1.5 | 1.5 |  |  |  |
|  | Desmodur TT |  |  |  |  | 1.5 |
|  | Titanium dioxide | 3 | 3 | 3 | 3 | 3 |
|  | Polyethylene wax | 0.5 | 0.5 | 0.5 | 0.5 | 0.5 |
| Cover resin properties | Hardness (Shore D) | 47 | 44 | 47 | 44 | 44 |
|  | Specific gravity | 1.18 | 1.18 | 1.18 | 1.18 | 1.18 |
| Ball properties | Diameter (mm) | 42.7 | 42.7 | 42.7 | 42.7 | 42.7 |
|  | Weight (g) | 45.1 | 45.1 | 45.1 | 45.1 | 45.1 |
|  | Hardness (mm) | 3.2 | 3.3 | 3.2 | 3.3 | 3.3 |
|  | Initial velocity (m/s) | 77.11 | 77.11 | 77.00 | 76.98 | 77.09 |
| Flight test (HS45) | Carry (m) | 215.5 | 215.5 | 214.0 | 214.5 | 215.0 |
|  | Total (m) | 226.5 | 226.5 | 224.5 | 225.0 | 226.0 |
| Feel |  | Exc. | Exc. | Exc. | Exc. | Exc. |
| Control |  | Exc. | Exc. | Exc. | Exc. | Exc. |
| Scuff resistance (Pt) |  | 5 | 5 | 3 | 3 | 5 |
| Discoloration |  | Exc. | Exc. | Exc. | Exc. | NG. |

Pandex T7298 non-yellowing thermoplastic polyurethane elastomer of aliphatic isocyanate, surface hardness 98 on JIS A scale, 48 in Shore D, by Dainippon Ink & Chemicals K.K.
Pandex TR3080 non-yellowing thermoplastic polyurethane elastomer of aliphatic isocyanate, surface hardness 80 on JIS A scale, 38 in Shore D, by Dainippon Ink & Chemicals K.K.
Desmodur W dicyclohexylmethane-4,4"-diisocyanate (hydrogen-addition MDI) by A.C.I. Japan Limited.
Desmodur TT TDI dimer, effective NCOG content 24–24.6 wt %, isocyanate species TDI, by Sumitomo-Bayer K.K.

Pandex T7298: non-yellowing thermoplastic polyurethane elastomer of aliphatic isocyanate, surface hardness 98 on JIS A scale, 48 in Shore D, by Dainippon Ink & Chemicals K. K.

Pandex TR3080: non-yellowing thermoplastic polyurethane elastomer of aliphatic isocyanate, surface hardness 80 on JIS A scale, 38 in Shore D, by Dainippon Ink & Chemicals K. K.

Desmodur W: dicyclohexylmethane-4,4"-diisocyanate (hydrogen-addition MDI) by A.C.I. Japan Limited.

Desmodur TT: TDI dimer, effective NCOG content 24–24.6 wt %, isocyanate species TDI, by Sumitomo-Bayer K. K.

As is evident from Table 2, the golf balls within the scope of the invention are easy to mold and show superior results for all of feel, control, initial velocity indicating resilience, and flight performance. The balls also show excellent scuff resistance upon iron shots.

In contrast, the golf balls of Comparative Examples in which the covers are not of the inventive cover stock are not satisfactory in all of feel, control, initial velocity (or resilience), and cuff resistance upon iron shots.

Japanese Patent Application No. 364154/1997 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A solid golf ball comprising a solid core and a cover enclosing the core, said cover being formed of a thermoplastic resin composition comprising a reaction product of a thermoplastic polyurethane elastomer with dicylcohexylmethane-4,4"-diisocyanate, wherein said dicylcohexylmethane-4,4"-diisocyanate is used in an amount of from 0.05 to 10 parts by weigh per 100 parts by weight of said thermoplastic polyurethane elastomer.

2. The solid golf ball of claim 1 wherein said thermoplastic polyurethane elastomer has been prepared using an aliphatic diisocyanate.

3. A method for preparing a solid golf ball, comprising the steps of:
    a) placing a solid core in a golf ball mold, and
    b) injection molding a cover stock around the surface of said solid core, wherein the injection molding step comprises:
        i) adding dicylcohexylmethane-4,4"-diisocyanate to a thermoplastic polyurethane elastomer in an amount of from 0.05 to 10 parts by weight per 100 parts by weight of said thermoplastic polyurethane elastomer, sufficient to allow injection molding,
        ii) heating and melting to react said thermoplastic polyurethane elastomer and said dicylohexylmethane-4,4"-diisocyanate, to form said cover stock, and
        iii) injecting the cover stock.

4. A method for preparing a solid golf ball, comprising the steps of:
    a) placing a solid core in a golf ball mold, and
    b) injection molding a cover stock around the surface of said solid core, wherein said cover stock comprises a dry blend of a thermoplastic polyurethane elastomer and dicylcohexylmethane-4,4"-diisocyanate wherein said dicylcohexylmethane-4,4"-diisocyanate is used in an amount of from 0.05 to 10 parts by weight per 100 parts by weight of said thermoplastic polyurethane elastomer, whereby the dry blend is kneaded and reacted while it is injection molded.

* * * * *